Sept. 11, 1962  R. R. HAGER  3,053,235
FLUID PRESSURE MOTOR CONSTRUCTION
Filed March 27, 1961 2 Sheets-Sheet 1
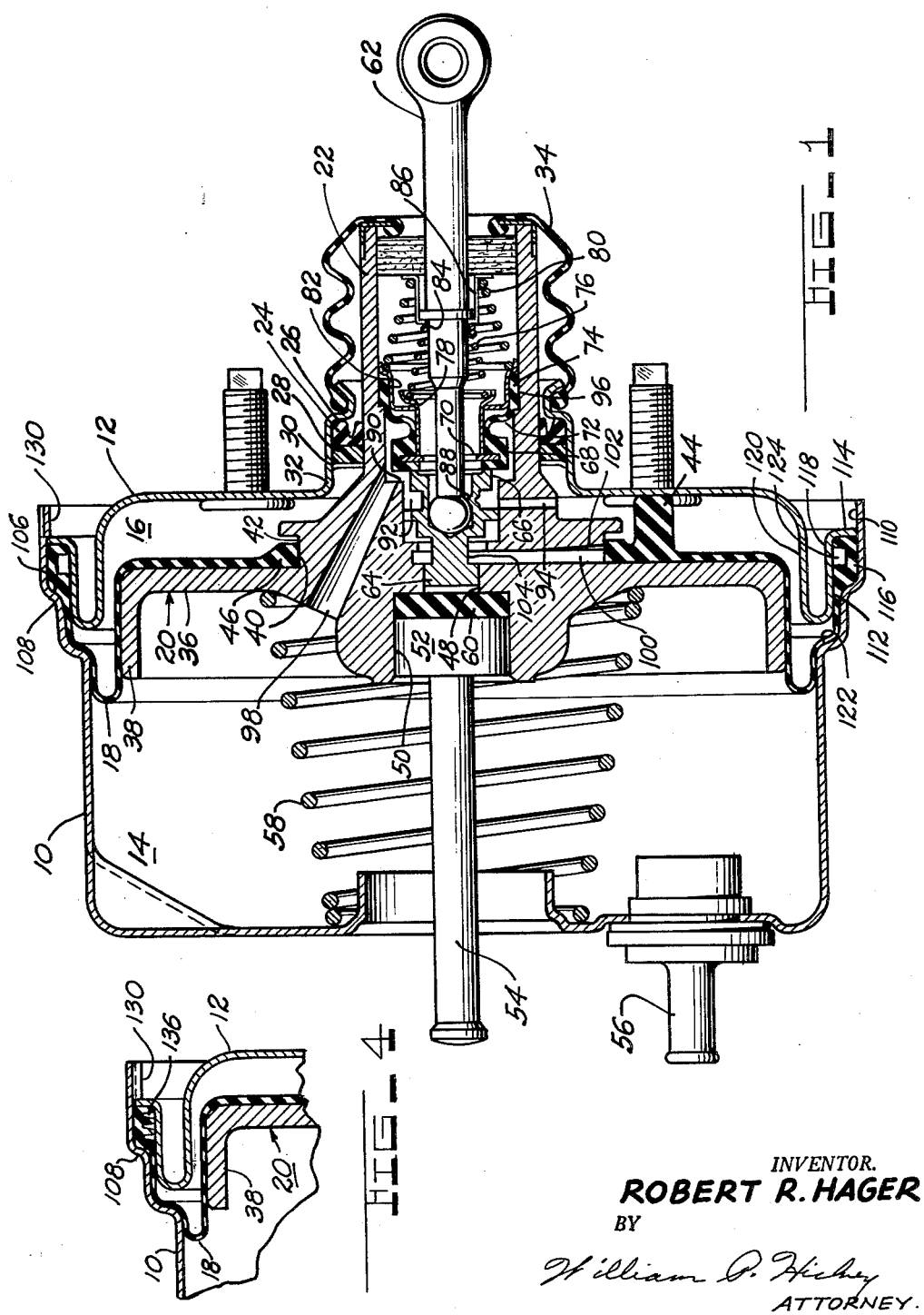
INVENTOR.
ROBERT R. HAGER
BY
William P. Hickey
ATTORNEY.

Sept. 11, 1962   R. R. HAGER   3,053,235
FLUID PRESSURE MOTOR CONSTRUCTION
Filed March 27, 1961   2 Sheets-Sheet 2
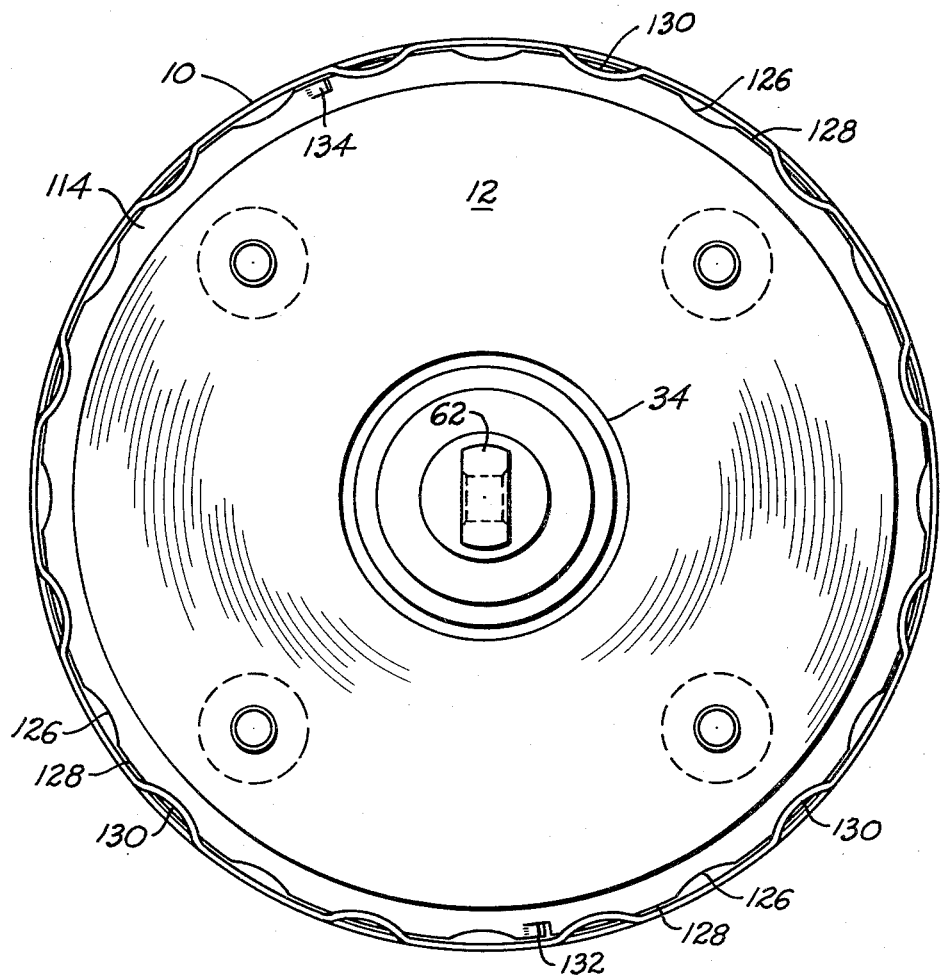
FIG_2
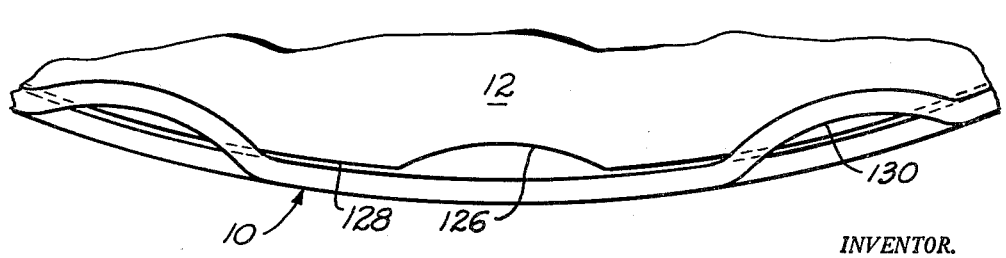
FIG_3
INVENTOR.
ROBERT R. HAGER.
BY
William P. Hickey
ATTORNEY.

United States Patent Office 3,053,235
Patented Sept. 11, 1962

3,053,235
FLUID PRESSURE MOTOR CONSTRUCTION
Robert R. Hager, South Bend, Ind., assignor to The
Bendix Corporation, a corporation of Delaware
Filed Mar. 27, 1961, Ser. No. 98,472
2 Claims. (Cl. 121—48)

The present invention relates to the type of fluid pressure motors wherein a diaphragm is clamped between two housing sections and more particularly to fluid pressure servomotors of the type which are used to power actuate the brakes of automotive vehicles.

An object of the present invention is the provision of a new and improved fluid pressure motor construction of the type wherein the diaphragm is clamped between two housing sections which is simple and rugged in design, and which permits speedy and accurate assembly of its parts.

A further object of the invention is the provision of a new and improved type of shell assembly for fluid pressure motors of the above described type which permits the diaphragm to effect a proper seal and gasketing pressure between the shell parts over an appreciable tolerance in the spacing of the shell sections and thereby permitting an accurate adjustment of the parts.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which:

FIGURE 1 is a longitudinal cross sectional view of a fluid pressure servomotor embodying principles of the present invention;

FIGURE 2 is an end view of the assembled motor shown in FIGURE 1;

FIGURE 3 is a fragmentary enlarged view of a portion of FIGURE 2; and

FIGURE 4 is a fragmentary view of another embodiment of the invention.

While the invention may be embodied in fluid pressure motors generally it is herein shown and described as embodied in a fluid pressure servomotor of the type used to power actuate the hydraulic braking systems of automotive vehicles.

The shell or housing of the servomotor shown in the drawings is formed by means of a cup-shaped front housing section 10 and a rear cover section 12 which is slid into the open end of the front section and suitably held in place to provide an enclosure for its axially extending internal chamber. The internal chamber of the servomotor is divided into front and rear opposing power chambers 14 and 16 respectively by means of a diaphragm 18—the radially outer portion of which is suitably clamped between the housing sections, and the radially inner portion of which is sealingly affixed to a diaphragm plate 20. In the preferred embodiment shown in the drawing, the diaphragm plate 20 is made in one integral plastic piece having a rearwardly extending cylindrically formed boss 22 which projects out through an opening in the rear cover plate 12 for the purpose of providing a sliding vacuum type seal with respect to the cover plate 12. The sliding vacuum seal may be formed in any suitable manner; and as shown in the drawing, is formed by a U-packing 24 that is seated up against a stamped shoulder 26 in the cover plate 12. The U-packing 24 is held in place by means of an annular spaldite washer 28—which in turn is held in place by means of an annular metal ring 30 having an interference fit with respect to the sidewalls of the stamped cylindrical section 32 of the cover plate 12. A corrugated rubber boot 34 is suitably affixed between the outer end of the cylindrical boss 22 and the outer end of the stamped cylindrical section 32 of the cover plate 12 to provide a suitable dirt seal for the sliding sealing outer surfaces of the cylindrical boss 22.

The diaphragm plate 20 is further provided with a radially extending integral flange 36 for the purpose of supporting the center section of the diaphragm 18; and inasmuch as the diaphragm shown is of the curtain type, the periphery of the integral flange 36 is turned forwardly as at 38 so that the diaphragm 18 will lay up against the periphery of the turned portion 38 in the manner customary for curtain diaphragm structures. The radially inner portion of the diaphragm 18 has a central opening 40 therethrough of a diameter which will slip or pass over the annular boss 22. The diaphragm plate 20 is of course thickened at the juncture of the cylindrical boss 22 and the integral flange 36; and a suitable diaphragm receiving groove 42 is provided in this thickened portion adjacent the rear surface of the integral flange 36 to provide a seat into which the diaphragm 18 may be snapped. The diaphragm 18 may be provided with rubber bumpers 44, and a thickened annular portion 46, as explained in the Maxwell L. Cripe application Serial No. 75,596; so that once the diaphragm is seated in position in the groove 42, a vacuum tight seal will automatically be provided between the diaphragm 18 and the diaphragm plate 20.

The servomotor shown in the drawing is of the type which is intended to be used for the power actuation of a conventional master cylinder of an automotive hydraulic braking system; so that the front end of the shell 10 is adapted to be bolted directly to the rear end of the master cylinder in a manner providing a vacuum tight seal. The diaphragm plate 20 is provided with an axially extending opening 48 which extends from the front surface of the diaphragm plate 20 through the cylindrical boss 22; and the front end of the opening 48 is enlarged as at 50 to receive the headed end 52 of a push rod 54 which abuts and drives the hydraulic piston of the master cylinder, not shown.

In the fluid pressure motor construction shown in the drawing, vacuum is continually supplied to the front opposing power chamber 14 through a tubular check valve structure 56; and the diaphragm plate 20 is caused to be biased into the position shown in the drawing by the piston return spring 58, whenever vacuum is also admitted to the rear opposing power chamber 16. A block of elastomeric material 60 is provided between the headed end 52 of the push rod 54 and the bottom of the enlarged section 50 of the axially extending opening 48, for the purpose of resiliently transmitting force from the diaphragm plate 20 to the push rod 54, as is explained more fully in the above referred to Maxwell L. Cripe application.

The structure so far described will have utility in various types of fluid pressure motors. Power output of the fluid pressure motor is of course regulated by controlling the pressure in the rear opposing power chamber 16; and inasmuch as the motor shown in the drawing is a servomotor, the control valve structure is mounted in, and carried by the diaphragm plate 20. In the servomotor construction shown in the drawing, the control valve structure is very conveniently and simply constructed by a plurality of elements which are stacked upon the control rod 62—and after which, the assembly is completed by inserting the stacked elements into the rear end of the central opening 48 in the cylindrical boss 22.

The elements which are assembled upon the push rod 62 generally comprise a control member 64 having a rearwardly facing annular atmospheric valve seat 66 thereon for sealing abutment with a flexible annular rubber poppet member 68. The annular rubber poppet member 68 is suitably stiffened by an annular metal washer 70 about which the rubber is molded; and the poppet member 68 further includes an integral flexible diaphragm portion 72 having a radial outer periphery which is suitably thickened for sealing engagement with the sidewalls of the axial opening 48 in the cylindrical boss 22. The rubber poppet member 68 is biased up against the atmospheric valve seat 66 by a coil spring 76 that is interpositioned between the rod 62 and a flanged tube 78 which is fitted into the inside of the annular poppet member 68 in abutment with its stiffening washer 70. The valve structure is caused to assume the normal servomotor deactuating position shown in the drawing by a valve return spring 80 which is interpositioned between the push rod 62 and a sealing washer 82 which biases the outer thickened portion 74 of the poppet diaphragm 72 into sealing engagement with the sidewalls of the opening 48. A suitable shoulder 84 is provided on the push rod 62 for receiving a spring retainer 86 against which the valve return spring 80 is positioned.

The opening 48 through the diaphragm plate 20 is provided with a plurality of gradually increasing diameter sections proceeding from its smallest portion adjacent the reaction disc 60 to the rear opened end of the cylindrical boss 22; so that all of the parts which are assembled upon the push rod 62 can be slid into position. The previously enumerated valve parts will be assembled on the push rod 62 in generally the reverse order given above; and after the control member 64 is placed over the ball end of the push rods 62, it is suitably staked in position as at 88. The vacuum valve seat 90 for the control valve structure is provided by a shoulder formed by increasing the diameter 48 at a position generally opposite to the assembled position of the atmospheric valve seat 66; so that a small annular control pressure area exists between the two valve seats 66 and 90. This control pressure area 92 extends around the control member 64 and is communicated to the rear opposing power chamber 16 by means of the control passage 94. The outer periphery of the poppet member 68 is of course adapted to seat against the vacuum valve seat 90; and the central opening 48 is further enlarged at a point rearwardly of the vacuum valve seat 90 to provide a suitable shoulder 96 against which the outer thickened portion 74 of the poppet member is positioned to assure a vacuum tight seal with respect to the sidewalls of the opening 48. Vacuum is continually communicated to the annular area radially outwardly of poppet member 68 between the shoulders 90 and 96 by means of the vacuum passage 98 which is cast in the diaphragm plate 20 to at all times communicate with the front opposing power chamber 14.

After the valve parts are assembled in the above described manner, they are retained within the diaphragm plate by means of a retaining pin 100 which is inserted into an opening which extends between the groove 42 and the axially extending opening 48 in the region opposite the control member 64. The control member 64 is provided with a groove 104 therein into which the retaining pin 100 extends to prevent withdrawal of the valve parts. Retaining pin 100 has sufficient length so that its outer end is flush with the bottom of the groove 42 when its inner end is seated in the bottom of the groove 104. Thereafter the rubber diaphragm 18 is slipped over the cylindrical boss 22, and its thickened annular portion 46 snapped into the groove 42 to automatically provide a seal with respect to the diaphragm plate 20, and at the same time hold the retaining pin 100 in position. The groove 104 has sufficient axial length so as to permit the necessary valve actuating travel to the control member 64; and is so positioned relative to the vacuum valve seat 90 and the reaction disc 60, that the front end of the control member 64 will be out of engagement with the reaction disc 60 and the valve poppet 68 will have predetermined clearance with respect to the vacuum valve seat 90 when the inner edge of the groove 104 is in abutment with the retaining pin 100.

It will be seen that the servomotor construction so far described is the epitomy of simplicity. As has been previously explained, the entire assembly of the control valve structure is accomplished by stacking elements upon the push rod 62, and thereafter inserting the entire valve assembly into its receiving bore to automatically place the various elements in proper operating position and at the same time effect all of the necessary sealing engagements in the valve structure.

According to principles of the present invention, the internal sidewalls of the shell 10 are provided with a generally axially outwardly facing shoulder 106 adjacent the outer end of the shell 10; and the sidewalls of the shell inwardly of the shoulder 106 as at 108, and outwardly of the shoulder as at 110 are generally smooth circumferentially continuous, axially extending, surfaces for reasons which will later be explained. The cover member 12 is provided with an axially extending surface 112 having a predetermined clearance with respect to the inner sidewall section 108; and a radially outwardly extending flange portion 114 having a close sliding fit with respect to the outer sidewall portion 110 of the shell 10. The structure is completed by a flexible diaphragm 18. In some instance the diaphragm 18 may have thickness greater than the above described predetermined clearance between the surfaces 108 and 112; so that the diaphragm 18 will be squeezed radially therebetween to effect a seal when the cover member 12 is telescoped into the opened end of the shell section 10. The diaphragm 18 further includes an enlarged portion or bead 116 which is confined between the surfaces 110 and 112, and is axially compressed between the shoulder 106 and the shoulder provided by the outwardly turned flange portion 114. In other instances the diaphragm 18 may be thinner than the clearance between the surfaces 108 and 112, so that the bead 116 alone effects the fluid pressure seal. By means of the sealing structure so far described, a fluid pressure seal is automatically established when the cover member is telescoped into the opened end of the shell section 10; and a gasketing pressure is established between the shoulder 106 and shoulder of the outwardly turned flange portion 114 during the same telescoping movement. Any suitable means can be used to clamp the shell sections 10 and 12 together, and the axial stiffness of the bead 116, among other things serves the purpose of holding the clamping means sufficiently rigid to prevent the reversal of pressure forces within the motor from producing axial movement of the cover member 12 relative to the shell 10. The cover member 12 may be clamped to the shell section 10 in any suitable manner, as for example by the hook bolts seen in patent application 695,094, now Patent No. 2,978,080, or the interlocking stamped shell and cover arrangement shown and described in the Price et al. application 39,932.

In the preferred arrangement of the pressure motor shown in the drawing, the diaphragm 18 is what is known as a curtain diaphragm and is folded over the cylindrical surface provided by the axially extending projection 38 of the diaphragm support plate 36 when the diaphragm support plate 36 is positioned generally radially inwardly of the sealing structure so far described. In the arrangement shown, the cover member 12 is formed by a stamping which is bent inwardly over the top of the axial projection 38 as at 120 and the cover member 12 is then bent axially outwardly again as at 118 in a U-shaped arrangement to provide the axial surface 112 previously described. By means of this arrangement the axial dimension of the servomotor is kept to a bare minimum. In the preferred embodiment shown in the drawing, the shell section 10 is further provided with a second shoulder 122 to reduce the internal diameter of the shell 10 forwardly of the cover plate 12. This reduces the air gap between the axial projection 38 of the diaphragm plate 36 and shell 10, and thereby reduces the forces which the diaphragm 18 is subjected to.

In the mass production of the parts which are used to form the servomotor shown in the drawing, it is necessary to provide a tolerance for the various parts; so that when the various parts are assembled, no two assemblies will have the same clearances between its various parts. By means of the arrangements shown in the drawing, it will be seen that a tight fluid pressure seal is provided with respect to the cover member 12 and shell 10 regardless of the axial position assumed by the cover member 12 during assembly. In some instances the bead 116 of the diaphragm 18 may be made solid, and the cover member 12 held up against the bead with a predetermined gasketing force while the cover member 12 is clamped in place. With this arrangement, it can be assured that the cover member 12 will always be held tightly in the shell 10 so that reversal of pressure forces in the motor do not cause the cover member 12 to move in the shell. According to still further principles of the invention, however, a greater amount of axial movement can be accommodated in the structure by providing a groove or other suitably formed void 124 in the bead 116. With this construction, the portion of the bead which extends between the shoulder 106 and flange 114 provides a more or less constant gasketing pressure as the cover member 12 is pressed into the shell 10, and as the rubber is being squeezed into the void 124. A sufficient axial force can thereby be provided to prevent the cover member 12 from being moved relative to the shell 10 even though the void 124 is not completely filled; while at the same time avoiding the sudden increase in gasketing force which occurs when the rubber goes solid or is totally confined within the space provided by the surfaces 110 and 112 and shoulders 106 and 114.

In prior art structures, it has been necessary to provide a threaded nut or other suitable axial adjustment on the push rod 54 so as to provide an adjustment for the projection of the push rod 54 out of the shell 10 after assembly. By means of the structure shown in the drawing it is possible to eliminate this adjusting structure. With applicant's new and improved shell assembly, it is possible to axially bias the cover member 12 inwardly against the movable wall structure until the desired projection of the push rod 54 out of the cover shell section 10 is provided; and thereafter fasten the cover member 12 and shell section 10 together. This can be conveniently accomplished by deforming the shell 10 inwardly over the outer surface of the flange 114 as is more fully described in the Sanders et al. application carrying the designation BK–1264. In the preferred embodiment shown, the flange 114 is scalloped at spaced apart points as at 126 to provide land or finger portions 128 therebetween. The shell 10 is bent inwardly as at 130 at correspondingly spaced points so as to abut the fingers 128 and thereby hold the cover 12 in place. The cover 12 is provided with an outwardly bent portion as at 132 to limit rotation of the fingers completely past the indentations 130. The cover 12 can be rotated in the opposite direction past the slightly raised detent 134 to align the scallops 126 with the indentations 130, and thereby permit the cover 12 to be removed. As explained in the Sanders et al. application, the indentations are preferably made after assembly at a position which provides the desired projection of the push rod 54 out of the shell section 10.

The embodiment shown in FIGURE 4 is identical to that above described excepting that the necessary void in the bead 116 is provided by means of several small grooves 136.

It will be apparent that the objects heretofore enumerated as well as others have been accomplished; and that there has been provided a new and improved structure for effecting a diaphragm seal between two shell sections to permit their quick and ready assembly and at the same time provide an adjustment for the internal parts of the fluid pressure motor which has not been possible heretofore.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim,

1. A fluid pressure motor comprising: a generally cup-shaped housing section having an internal chamber with a closed front end, an open rear end, and an inner section with axially extending sidewalls; an end closure member for said chamber; a diaphragm back-up plate adapted for axial movement in said chamber; said back-up plate having a normal retracted position adjacent said end closure member, and further having an axially extending radially outer surface spaced a predetermined distance from said sidewalls of said chamber; the portion of the sidewalls of said chamber that is positioned radially outwardly of said retracted position of said back-up plate being stepped radially outwardly toward said open end of said housing in two stages to provide intermediate and outer axially extending surfaces, said intermediate surface being separated from said inner section of sidewalls by a first axially outwardly facing shoulder, and said outer surface being separated from said intermediate surface by a second axially outwardly facing shoulder; a curtain diaphragm having a radially inner portion sealed to said back-up plate, a radially outer portion for sealing engagement with said housing, and an intermediate U-shaped curtain section which rolls against said axially extending surfaces of said back-up plate and inner housing section, said radially outer portion of said diaphragm laying up against said intermediate and outer surfaces; and said end closure member having a ring portion which extends forwardly over said radially outer surface of said back-up plate to hold said radially outer portion of said diaphragm against said intermediate and outer surfaces of said housing; and said closure member also having an inwardly facing shoulder for squeezing the outermost portion of said diaphragm against said second shoulder of said housing section.

2. A fluid pressure motor comprising: a generally cup-shaped housing section having an internal chamber with a closed front end, an open rear end, and an inner section with axially extending sidewalls; an end closure member for said chamber; a diaphragm back-up plate adapted for axial movement in said chamber; said back-up plate having a normal retracted position adjacent said end closure member, and further having an axially extending radially outer surface spaced a predetermined distance from said sidewalls of said chamber; the portion of the sidewalls of said chamber that is positioned radially outwardly of said retracted position of said back-up plate being stepped radially outwardly toward said open end of said housing in two stages to provide intermediate and outer axially extending surfaces, said intermediate surface being separated from said inner section of sidewalls by a first axially outwardly facing shoulder, and said outer surface being separated from said intermediate surface by a second axially outwardly facing shoulder, a curtain diaphragm having a radially inner portion sealed to said back-up plate, a radially outer portion for sealing engagement with said housing, and an intermediate U-shaped curtain section which rolls against said axially extending surfaces of said back-up plate and inner housing section, said radially outer portion of said diaphragm laying up against said intermediate and outer surfaces; and said end closure member having a ring portion which extends forwardly over said radially outer surface of said back-up plate to hold said radially outer portion of said diaphragm against said intermediate and outer surfaces of said housing; said closure member also having an inwardly facing shoulder for squeezing the outermost portion of said diaphragm against said second shoulder of said housing section; and said outermost portion of said diaphragm having a void therein which permits said closure member to be positioned accurately in said housing.

References Cited in the file of this patent

UNITED STATES PATENTS

| | | |
|---|---|---|
| 2,742,785 | St. Clair | Apr. 24, 1956 |
| 2,969,046 | Kellogg et al. | Jan. 24, 1961 |